Figure 6:
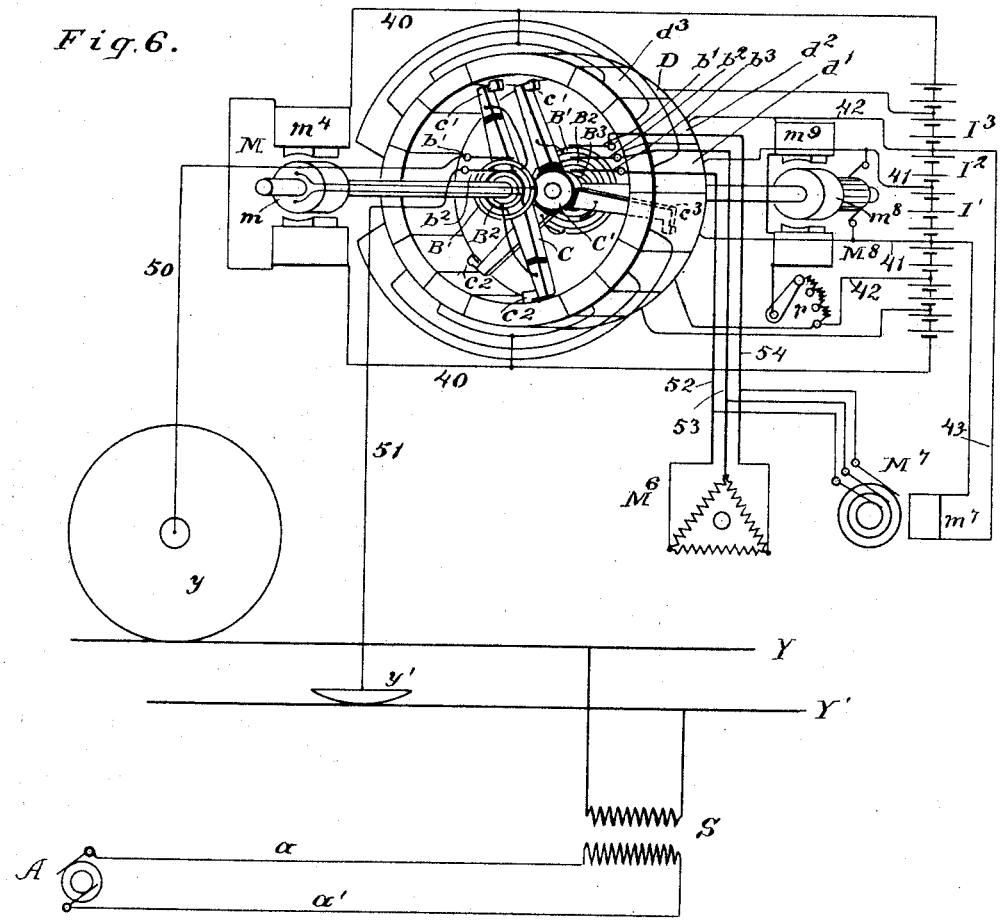

No. 621,827. Patented Mar. 28, 1899.
W. H. KNIGHT.
SYSTEM OF ELECTRICAL DISTRIBUTION.
(Application filed Mar. 18, 1898.)
(No Model.) 2 Sheets—Sheet 1.
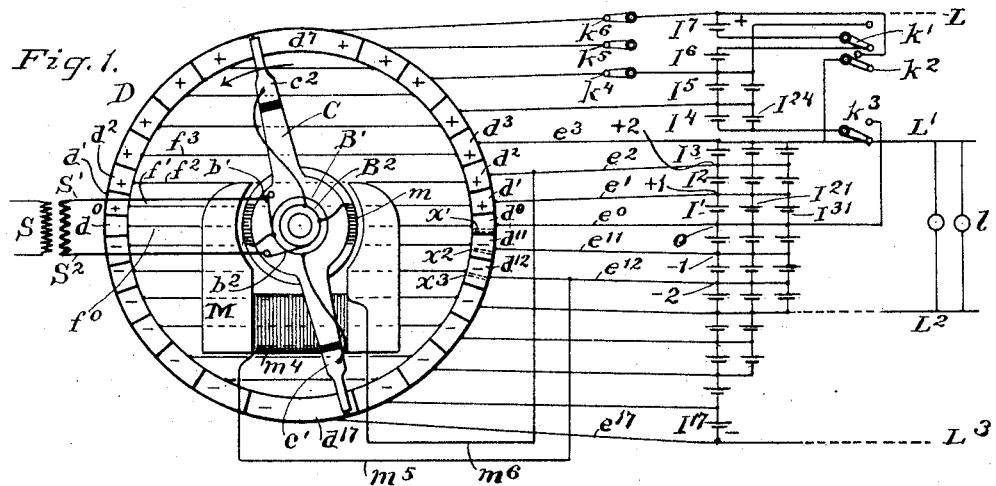
Fig. 1.
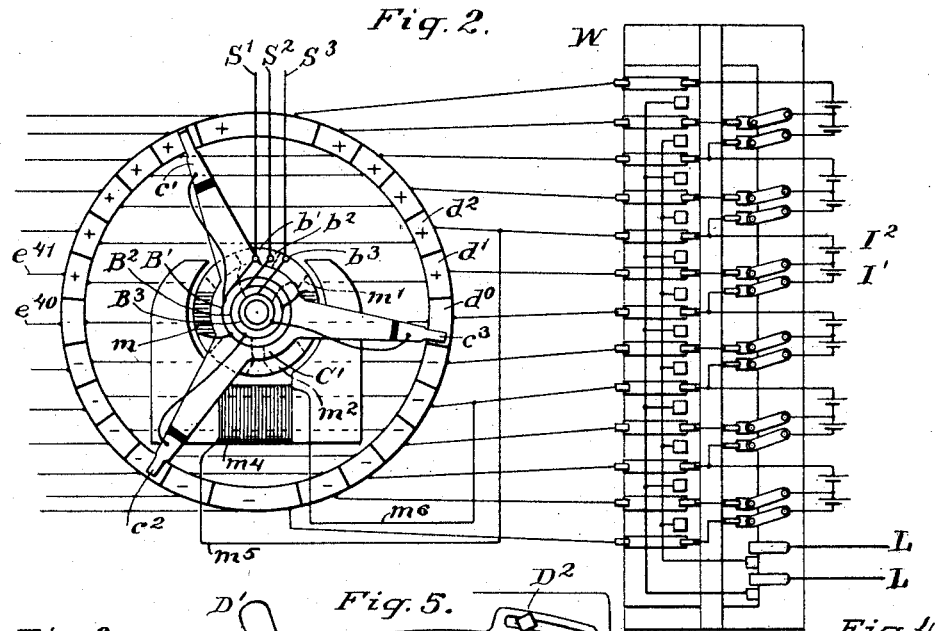
Fig. 2.
Fig. 3. Fig. 5. Fig. 4.
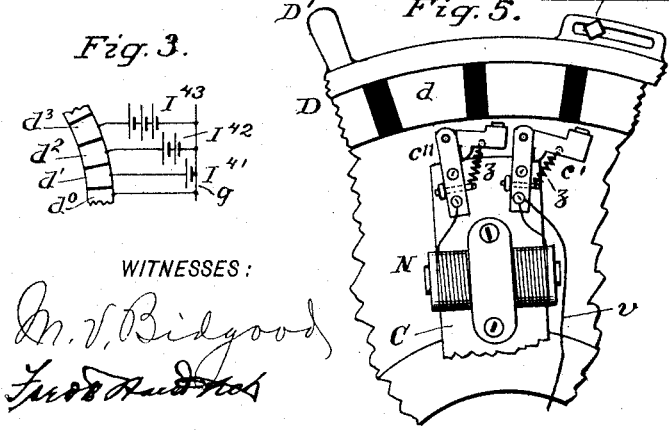
WITNESSES:
INVENTOR
Walter H. Knight
BY
ATTORNEYS
THE NORRIS PETERS CO., PHOTO-LITHO., WASHINGTON, D. C.

No. 621,827. Patented Mar. 28, 1899.
W. H. KNIGHT.
SYSTEM OF ELECTRICAL DISTRIBUTION.
(Application filed Mar. 18, 1898.)
(No Model.) 2 Sheets—Sheet 2.

WITNESSES:
INVENTOR
Walter N. Knight
BY
ATTORNEYS

UNITED STATES PATENT OFFICE.

WALTER H. KNIGHT, OF NEW YORK, N. Y.

SYSTEM OF ELECTRICAL DISTRIBUTION.

SPECIFICATION forming part of Letters Patent No. 621,827, dated March 28, 1899.

Application filed March 18, 1898. Serial No. 674,303. (No model.)

*To all whom it may concern:*

Be it known that I, WALTER H. KNIGHT, a citizen of the United States, residing at New York, (New Brighton,) in the county of Richmond and State of New York, have invented certain new and useful Improvements in Systems of Electric Distribution, of which the following is a specification.

This invention relates to improvements in systems of electric distribution; and its object is to enable the efficient conversion of alternating-current energy into direct-current energy and at the same time to enable the storage of such direct-current energy and its delivery at any desired potential.

My invention relates to a system wherein an alternating supply-circuit is placed in connection with a plurality or series of storage-cells, the connections thereof being automatically and successively changed to correspond with the alternating changes of electromotive force in the supply-circuit, so that the instantaneous impressed electromotive force of the supply-circuit as it alternates or undulates between its positive and negative values is at each instant opposed by a counter electromotive force from the cells substantially proportional to the impressed electromotive force. Inasmuch as efficiency of storage depends on the maintenance of the counter electromotive force at a small and fairly constant percentage below the impressed electromotive force, it is apparent that by this system a high efficiency of storage and conversion may be attained in spite of the undulating nature of the supply-current. The energy so stored in the storage-cells may be delivered in the form of direct current of a potential and with a rate of discharge appropriate to the load on a consumption-circuit connected thereto. The system may therefore be regarded as a means of conversion of alternating-current energy into direct-current energy without the intermediation of a motor-generator; but it presents the additional advantage over a motor-generator system of effecting storage simultaneously with the conversion, so as to render the consumption-circuit more or less independent of the supply-circuit as regards fluctuations of the load in one or of the supply in the other. In order to provide for such fluctuations, it has been often deemed advisable to use storage batteries in connection with motor-generator systems of conversion, such batteries absorbing the surplus energy under conditions of excessive supply or small consumption and delivering the stored energy under the reverse conditions. As compared with such a system the system herein referred to has the advantage of dispensing with the motor-generator, and thus avoiding the expense of installation and maintenance of same and the loss of electrical energy involved in the operation of such motor-generator. In order to vary the connections of the storage-cells to the supply-circuit, so as to vary their counter electromotive force in correspondence with the undulations of the alternating circuit, commutating or switching devices are connected to the storage-cells and the supply-circuit and operated in synchronism with the alternations of the supply-circuit—as, for example, by means of a synchronous motor connected to such circuit. In such a system the difficulty arises that the storage-cells when placed in series are unequally subjected to the charging action, as some cells are in circuit almost continually, while others are in circuit for intervals more or less short. To overcome this objection, I provide switching devices which are arranged to vary the connection between the several cells, so as to equalize the charging effects. These switching devices may be arranged to transfer any of the cells of the battery from a position where they receive a light charge to a position where they will receive a heavy charge. Equalization can also be effected to some extent by switching devices which when desired place the cells in multiple relation, so that the overcharged ones tend to discharge into the undercharged ones. I may also provide switching devices to remove any or all of the cells from connection with the supply-circuit and place them in connection with an independent consumption-circuit.

The system above described is also capable of an inverse operation, so as to supply alternating currents from a system of direct-current sources, and these modes of operation may be combined in one system, so as to enable the energy of an alternating supply-circuit to be taken up by a storage system and given out again simultaneously or otherwise in the form of alternating currents differing from the original current in phase or periodicity, or both.

In the accompanying drawings, which form a part of this specification, Figure 1 is a diagram showing the preferred manner of carrying out my invention. Fig. 2 is a similar diagram showing a modified arrangement. Figs. 3 and 4 are diagrams showing a modified connection of the storage-cells to the commutator. Fig. 5 is a detail view of a portion of the commutator and its brushes. Fig. 6 shows the application of the invention as a phase and cycle changer in connection with an electric-railway system.

In Fig. 1, $S'$ $S^2$ represent the lead-wires of a single-phase alternating electric supply-circuit, proceeding from a source of alternating-current supply, such as an alternator or a transformer, (indicated at S,) and connected to brushes $b'$ $b^2$, bearing on collector-rings $B'$ $B^2$, which deliver the alternating current to the respective contacts $c'$ $c^2$ of the rotary arm or member C of the commutating device and to the armature-coil $m$ of a synchronous motor M, which is mechanically connected to the arm or member C, so as to drive same in synchronism with the impulses of the supply-circuit. The commutating device also comprises a relatively-fixed member D, with a series of contacts $d^0$ $d'$ $d^2$, &c., preferably arranged in a circle and engaging with the contacts $c'$ $c^2$ or with brushes thereon and connected by separate connections $e^0$ $e'$ $e^2$, &c., with different points of a set or series of storage cells or batteries $I'$ $I^2$ $I^3$, &c. Leads $L'$ $L^2$ may be taken off from any suitable point in the storage-battery connections to the points of consumption, (indicated at 1.)

For the purpose of explanation we may assume that a horizontal position of commutator member C with contact $c'$ at the right corresponds to the instant when the electromotive force of the supply-circuit is passing through zero value and that as the contacts $c'$ $c^2$ pass from this position in the direction of the arrow the potential of the side $S'$ of the supply-circuit, and therefore the potential of the brush $b'$ and contact $c'$, connected thereto, gradually rises or increases in positive value, while at the same time the potential of the lead-wire $S^2$, brush $b^2$, and contact $c^2$ gradually falls or increases in negative value until member C passes the vertical, after which the potentials again gradually decrease and pass through zero value as the arm passes a horizontal position. At this instant the electromotive force in the supply-wires $S'$ $S^2$ becomes reversed in polarity; but at the same time the connections of said wires through contacts $c'$ $c^2$ with the respective upper and lower halves of the fixed commutator element D become mutually interchanged or reversed, so that the upper contacts $d'$ $d^2$, &c., always receive positive charges and the lower contacts $d^{11}$ $d^{12}$, &c., always receive negative charges. The intensity or potential of the charges impressed upon the several contacts increases successively from the zero contacts $d^0$ to the highest contact $d^7$ and then decreases successively to zero contact $d^{10}$. Thus for each contact on the ascending side there is a corresponding contact in the descending side which receives impulses of substantially the same potential, and these corresponding contacts, as $d^0$ $d^0$, which are similarly lettered on opposite sides, as $d^0$ $d^0$ $d'$ $d'$, &c., may be connected by cross connections $f^0$ $f'$ $f^2$, &c. The storage-cells when being charged are preferably connected in series or in several groups, the cells of each group being connected in series, connections $e^0$ $e'$, &c., being made from the respective contacts $d^0$ $d'$, &c., to such points in the series connections of the cells as present electromotive forces corresponding to or somewhat below the electromotive force of the impulses received by such contacts from the line. Thus the zero contact $d^0$ being connected at the point represented by the numeral 0 to the middle point of the series of cells, the next contact $d'$ or $d^{11}$ on either hand is connected at $+1$ or $-1$, so as to include one cell between $d^0$ and $d'$ and one cell between $d^{11}$ and $d^0$. The succeeding contacts $d^2$ and $d^{12}$ are connected to the series battery at $+2$ and $-2$, so as to include additional cells of battery, and so on, until between the extreme contacts $d^7$ and $d^{17}$ the whole battery of cells is included in series. It is clearly simply a matter of the proper selection of the voltage of the alternating source and of the disposition of contacts $d^0$ $d'$, &c., to provide that at each instant the supply-circuit is put into connection with a sufficient number of storage-cells in series to oppose all or any desired proportion of its electromotive force. Inasmuch as with the ordinary sinusoidal alternating current the electromotive force rises more rapidly when near the zero-point, it may be desirable to make the contacts near $d^0$ shorter or closer together than the contacts corresponding to the maximum points of the wave, as indicated in Fig. 1. It will also be noted that those storage-cells which are nearer the zero-point or middle of the battery are taking current during a greater part of the time than are the cells near the extremes of the battery. This would result in inequality of charge; but this objection may be overcome by placing a number of cells in multiple in the middle part of the battery and decreasing the number of cells in multiple toward each extreme end of the battery, so that the excessive charge toward the middle of the battery will be divided up among a correspondingly larger number of cells. Thus in Fig. 1 I have indicated cells $I^{21}$ $I^{31}$ in multiple with cell $I'$ at the middle of the battery, while farther out the cell $I^4$ has only one cell $I^{21}$ in multiple therewith, and at the extreme ends the battery is limited to single cells $I^6$ $I^7$, &c., in series. The same object—namely, equalization of charge—may be effected by suitable switching devices, by which the relative arrangements or connections of the batteries may be interchanged or transferred from time to time, so as to transfer any of the cells from a position where they are receiving a light charge to a position where they will receive a heavy charge. Thus, for example, in Fig. 1 the switches $k' k^2 k^3$, normally in the positions indicated, place the cells $I^5 I^6 I^7$ in series at one extreme end of the battery; but by raising these switches the cells aforesaid are transferred to another part of the battery—namely, between the zero or middle point connection $e^0$ and lead-wire $e^3$. Switches $k^4 k^5 k^6$ should also be provided for breaking the connection between any of the cells of the storage-battery and the commutator-contacts. The use of the transfer-switches above described is especially desirable when the batteries are to be discharged, as the cells may thereby be brought into uniform multiple-series connection, so as to bring an equal load on each cell. Similar switching devices may also be provided for switching cells normally connected to the middle parts of the battery to connection with the outer parts thereof.

For simplicity's sake I have referred to single cells connected between the successive contacts of the commutator; but it will be understood that there may be included between the successive contacts any desired number of cells in series, multiple series, or multiple, according to the requirements of the case. Moreover, the voltages between successive contacts may be made to vary in any desired manner by suitably varying the number of cells connected in series between them, as indicated at $I' I^2 I^3$ in Fig. 4. By such an arrangement the same effect can be produced as by the variation in the width of the contacts $d' d^2$, &c. (Shown in Fig. 1.) Furthermore, the grouping of the cells with regard to the contacts may be varied in any desired manner. Thus, as indicated in Fig. 3, the successive contacts $d' d^2$, &c., may be connected by a common return-wire $g$ with the middle or zero contact $d^0$ through different batteries or sets of cells $I^{41} I^{42} I^{43}$, &c., the sets farther from the zero-point including a greater number of cells in series, so as to maintain the contacts connected thereto at successively higher potentials.

By any of the above modes of connection there can be opposed to the charging electromotive force at each instant a counter electromotive force bearing any desired ratio thereto, so that the efficiency of the system during charging may be increased to any desired extent. In some cases it may be desirable to carry the counter electromotive force during a part of the time to a point where it will substantially equal the impressed electromotive force, so that during such time there will be practically no current flowing. This may be desirable near the "zero" or "middle" points for the reason that but little loss in efficiency will result from cessation of charging during these periods of very low electromotive force, while the charging when it does take place in the points of higher electromotive force will be more uniformly distributed over the battery. The dotted lines $x' x^2 x^3$ in Fig. 1 indicate a shortening or advancement of the commutator-contacts such as may produce the above result. The working leads may be taken off from the battery at the extreme ends thereof, as indicated at $L$ and $L^3$, or at intermediate points, as at $L' L^2$.

While I have above described my invention as applied to a single-phase alternating supply-circuit, it will be understood that it is equally applicable to a multiphase system. Thus in Fig. 2, $S' S^2 S^3$ may represent the supply-mains of a three-phase system of distribution, connecting through brushes $b' b^2 b^3$ and collector-rings $B' B^2 B^3$ with the respective contacts $c' c^2 c^3$ of the rotating member $C'$ of the commutator whose fixed contacts $d^0 d' d^2$, &c., are connected to the storage-cells $I' I^2$, &c. The member $C'$ of the commutator may be driven by a single armature-coil $m$, connected between two of the collector-rings, or the armature may have the usual three-phase coils (the additional coils being indicated in dotted lines at $m' m^2$) connected to the several collector-rings in the usual manner. In this figure I have also shown a switch $W$, which in the position shown connects all the cells $I' I^2$, &c., in series with one another and also connects said cells at intervals with the successive commutator-contacts $d' d^2$, &c., and which when raised throws the cells out of connection with the commutator and into connection with the working circuit $L L$ and at the same time places them in multiple-series connection with one another. On the left of this figure I have indicated wires $e^{10} e^{41}$, &c., which may connect, through a switch similar to that indicated at $W$, to another storage battery, which may thus be brought into operation alternately with the storage battery shown, so that one battery may be charging while the other battery is discharging, and vice versa. In any case the field-magnet $m^4$ of the synchronous motor may be energized in any suitable manner, as by connection with the storage battery through leads $m^5 m^6$.

Fig. 5 shows certain details of construction of the commutator. The stationary or non-rotating element $D$ thereof I prefer to make in the form of a barrel or hollow ring of segments $d$, with the contact-faces on the inner side. The rotating arm $C$ carries at each end a pair of contacts or brushes, of which one pair $c' c^{11}$ is here shown, which are connected together through an inductive resistance $N$, these brushes being each of them too narrow to span the insulation between the successive segments $d$, but being so placed that between them they can span this insulation. Thus I prevent, on the one hand, the open-circuiting which would be caused by a single narrow brush and, on the other hand, the short-circuiting of the individual cells which would be caused by the passage over the commutator-insulation of a brush wide enough to span such insulation, such short-circuiting being prevented by the interposition of the inductive resistance. One of the brushes, as $c'$, is directly connected to the controller-ring by a connection $v$. Both brushes are preferably pivoted to or otherwise yieldingly supported on the arm C, and springs tend to draw said brushes inwardly away from the commutator-segments, so that when the commutator member C is at rest the connection from the supply-circuit to the storage batteries is broken. When, however, the member C is speeded up into synchronism with the supply-circuit, the brushes $c'$ $c^{11}$ are urged outwardly by centrifugal action to such an extent as to bring them in contact with the commutator-segments and then close the connection to the batteries. It is obvious that this device will operate to break circuit whenever the commutating devices fall out of synchronism—i. e., the standardized speed—for any reason. Any suitable governing device may, however, be used for this purpose.

In order to enable adjustment of the commutating devices to synchronism with the supply-current, the member D may be angularly adjustable and provided, as indicated in Fig. 5, with suitable shifting means $D'$ and clamping means $D^2$.

It is apparent that the method of operation herein described is reversible—that is to say, that from a battery of storage-cells or equivalent fixed sources of electromotive force capable of presenting a multiplicity of different electromotive forces, according to the manner of connecting same, an alternating or undulating current may be derived and used on a consumption-circuit. In such case the synchronous motor would be energized from the storage battery and the consumption-current would by means of the revolving contacts be connected successively to points of successively-varying potential in said battery in a manner analogous to that above described. Moreover, by combining these modes of operation the energy of an alternating current may be stored instantaneously or temporarily as direct-current energy in a storage battery and may then be given out again in the form of alternating currents differing from the original current in phase or periodicity, or both. In Fig. 6 I have shown such an application of my invention in connection with an electric-railway system, A representing an alternator, and S a transformer connected thereto by mains $a\ a'$ and supplying the energy from the said alternator to the working conductors Y Y', from which the traveling contacts $y\ y'$ convey the alternating single-phase current to the phase and cycle changer or commutator. The latter comprises a fixed member D and two independently-rotating members C C', of which member C carries two contacts $c'\ c^2$, connected through collector-rings $B'\ B^2$ and brushes $b'\ b^2$ to the lead-wires 50 51 from the traveling contacts $y\ y'$, while member C' carries three contacts $c'\ c^2\ c^3$, connected through collector-rings $B'\ B^2\ B^3$ and brushes $b'\ b^2\ b^3$ to the three leads 54 53 52 of a three-phase motor-circuit, which may include either an inductive motor, as indicated at $M^6$, or a synchronous motor, as indicated at $M^7$, such motor being in either case suitably arranged to propel the vehicle upon which the phase and cycle changer is mounted. Also mounted upon such vehicle is a set or battery of storage-cells $I'\ I^2\ I^3$, &c., which are connected at points of successively-varying potential to the successive contacts $d'\ d^2\ d^3$, &c., of the commutator member D. The member C is driven in synchronism with the alternations of the supply-current by means of a synchronous motor M, whose armature $m$ is connected across the alternating leads, as by means of the collector-rings $B'\ B^2$ and brushes $b'\ b^2$, the field-magnet $m^4$ of such motor being excited by connections 40, taken off from a suitable point in the battery-circuit. The member C' of the commutator is driven by a shunt-wound direct-current motor $M^8$, whose armature $m^8$ and field-magnet $m^9$ are connected by leads 41 and 42 with suitable points in the battery-circuit, a regulating-resistance $r$ being preferably included in the field-magnet circuit, the adjustment of which determines the speed at which the motor $M^8$, and thus the commutator member C', shall run. In case the main car-motor is of the synchronous form indicated at $M^7$ its field-magnet $m^7$ may be excited by connections 43, taken from the battery-circuit.

The energy of the single-phase alternating current delivered from the alternator A through mains $a\ a'$, transformer S, traveling contacts $y\ y'$, and leads 50 51 to the commutator member C is through the synchronous rotation of such member over the fixed member D, delivered to the storage battery in the form of direct-current impulses, and the member C' in rotating with respect to member D at any desired speed takes from said member and from the storage battery connected thereto a three-phase current whose periodicity is dependent on the speed of such member C', and thus on the speed of the "pilot-motor" $M^8$. The speed of rotation of the pilot-motor as determined by its regulating-resistance or other means thus determines the acceleration of the main car-motor $M^6$ or $M^7$.

Having thus described my invention, what I claim as new, and desire to secure by Letters Patent, is—

1. The combination with an alternating electric circuit and a storage battery comprising a plurality of cells, of a commutator provided with means for operating it in synchronism with the alternating circuit, and having a series of contacts connected to points of successively-varying potential in said battery, and switching devices for transferring the connections of the storage-battery cells with regard to each other and to the commutator, to equalize the charge in said cells.

2. The combination with an electric circuit, and a storage battery comprising a plurality of cells, of a commutator having a series of contacts, and switching devices and connections for connecting said successive contacts of the commutator to points of successively-varying potential in said battery and switching devices for varying the connections between the cells of the battery.

3. The combination with an electric circuit, and a storage battery comprising a plurality of cells, of a commutator having a series of contacts connected respectively to points of successively-varying potential in said battery, and switching devices controlling the connection between said commutator and the storage battery.

4. The combination with an alternating supply-circuit, of a commutator connected thereto and having a series of contacts, means for operating said commutator in synchronism with the alternations in the supply-circuit, a storage battery comprising a plurality of cells connected at points of successively-varying potential to the successive contacts of the commutator, and a consumption-circuit connected to said storage battery.

5. The combination with an alternating supply-circuit, of a commutator connected thereto and having a series of contacts, means for operating said commutator in synchronism with the alternations in the supply-circuit, a storage battery comprising a plurality of cells connected at points of successively-varying potential to the successive contacts of the commutator, a consumption-circuit connected to said storage battery, and switching devices controlling the connections of said storage battery to said consumption-circuit.

6. The combination with an alternating supply-circuit, of a storage battery comprising a series of cells, commutating devices connected to said supply-circuit and delivering its energy in impulses of successively-varying potential to points of said storage battery also of successively-varying potential, and a controlling device responsive to the speed of the commutating devices and controlling the connection between the supply-circuit and the storage batteries.

7. The combination with an alternating supply-circuit, of a storage battery comprising a series of cells, a commutator comprising a rotary brush connected to the supply-circuit and supported so as to be capable of moving radially, means for normally urging said brush toward its center of rotation, contacts comprised in said commutator and arranged in the path of said brush when the latter is thrown out by centrifugal force, and connections between the successive contacts and points of the battery of successively-varying potential.

8. The method of changing the phase of an alternating current which consists in rectifying and delivering same to a storage battery and deriving from said storage battery a number of simultaneous impulses corresponding to the phase desired, said impulses varying successively and alternately.

9. The method of changing the periodicity of an alternating current which consists in rectifying and delivering same to a storage battery and deriving from said battery impulses successively varying and alternating at a different rate to the original current.

10. The combination with an alternating supply-circuit, a working circuit of a storage battery comprising a series of cells, commutating devices comprising two portions, one portion being connected to the supply-circuit and provided with means for operating same synchronously with the alternations therein, and the other portion being connected to the working circuit and provided with means for operating same, and connections from the commutating devices to points of different potential in the battery.

11. The combination with an alternating supply-circuit, of a commutator device connected thereto and provided with means for driving same in synchronism with the alternations in such circuit, a working circuit and a commutating device connected thereto and provided with means for operating same, and a storage battery comprising a series of cells connected at points of successively-varying potential to successive points in each of said commutating devices.

12. The combination with a source of alternating supply, working conductors energized therefrom, a vehicle carrying traveling contacts engaging with such working conductors, a commutating device connected to said traveling contacts, a synchronous motor connected to said commutating device and operating same in synchronism with the alternations in the supply-circuit, an alternating motor arranged to drive the aforesaid vehicle, a commutating device connected to said motor, a motor for operating the latter commutating device and means for regulating the speed of the last-named motor, and a storage battery connected to each of said commutating devices.

13. The combination with an alternating supply-circuit, and a consumption-circuit, of a phase-changer transferring the energy from one circuit to the other while changing its phase, said phase-changer comprising a plurality of counter-electromotive-force generators, and commutating devices connected to both of said circuits, and to said counter-electromotive-force generators, and establishing between said circuits and the counter-electromotive-force generators successively varying and alternating connections differing in number according to the number of phases of the supply and consumption circuits respectively.

14. The combination with an alternating supply-circuit, and a consumption-circuit, of a periodicity-changer transferring the energy from the supply-circuit to the consumption-circuit while changing its periodicity, the same comprising a plurality of counter-electromotive-force generators, and commutating devices comprising portions connected respectively to said circuits, means for operating said portions at differing relative speeds corresponding to the periodicity of the supply and consumption circuits, and connections from each of such commutator portions to the counter-electromotive-force generators.

WALTER H. KNIGHT.

Witnesses:
HARRY E. KNIGHT,
M. V. BIDGOOD.